United States Patent
Zhang et al.

(10) Patent No.: US 10,687,083 B2
(45) Date of Patent: Jun. 16, 2020

(54) LOOP RESTORATION FILTERING FOR SUPER RESOLUTION VIDEO CODING

(71) Applicant: Intel Corporation, Santa Clara, CA (US)

(72) Inventors: Ximin Zhang, San Jose, CA (US); Sang-Hee Lee, San Jose, CA (US); Keith W. Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/001,488

(22) Filed: Jun. 6, 2018

(65) Prior Publication Data

US 2019/0052911 A1    Feb. 14, 2019

(51) Int. Cl.
*H04N 19/82* (2014.01)
*H04N 19/117* (2014.01)
*H04N 19/136* (2014.01)
*H04N 19/172* (2014.01)
*H04N 19/182* (2014.01)

(52) U.S. Cl.
CPC .......... *H04N 19/82* (2014.11); *H04N 19/117* (2014.11); *H04N 19/136* (2014.11); *H04N 19/172* (2014.11); *H04N 19/182* (2014.11)

(58) Field of Classification Search
CPC .... H04N 19/82; H04N 19/117; H04N 19/136; H04N 19/172; H04N 19/182; H04N 19/59; H04N 19/33; H04N 19/34
See application file for complete search history.

(56) References Cited

U.S. PATENT DOCUMENTS

| | | | | |
|---|---|---|---|---|
| 10,009,622 | B1* | 6/2018 | Mukherjee | H04N 19/124 |
| 2005/0105814 | A1* | 5/2005 | Bruls | H04N 19/147 |
| | | | | 382/240 |
| 2005/0248596 | A1* | 11/2005 | Smith | G09G 5/005 |
| | | | | 345/698 |
| 2005/0276323 | A1* | 12/2005 | Martemyanov | H03M 7/4006 |
| | | | | 375/240.03 |
| 2010/0166070 | A1* | 7/2010 | Goel | H04N 19/176 |
| | | | | 375/240.15 |
| 2013/0188686 | A1* | 7/2013 | Tourapis | H04N 19/59 |
| | | | | 375/240.02 |

(Continued)

OTHER PUBLICATIONS

Mukherjee et al., (hereinafter Mukherjee—NPL) "A Switchable Loop-Restoration With Side Information Framework for the Emerging AV1 Video Coding"; 978-1-5090-2175-8; (c) 2017 IEEE (Year: 2017).*

(Continued)

*Primary Examiner* — Dramos Kalapodas
(74) *Attorney, Agent, or Firm* — Green, Howard & Mughal LLP.

(57) ABSTRACT

Techniques related to selecting restoration filter coefficients for 2-dimensional loop restoration filters for super resolution video coding are discussed. Such techniques include upscaling reconstructed video frames along only a first dimension and selecting filter coefficients for portions of the frame by an evaluation that, for each pixel of the portion, uses only pixel values that are aligned with the first dimension. Selection of filter coefficients for the second dimension may be skipped or made using only a subset of available filter coefficients.

18 Claims, 9 Drawing Sheets

(56) References Cited

U.S. PATENT DOCUMENTS

| | | | | |
|---|---|---|---|---|
| 2014/0355667 A1* | 12/2014 | Lei | ................. | H04N 19/593 |
| | | | | 375/240.02 |
| 2014/0376630 A1* | 12/2014 | Sato | ................. | G06T 9/004 |
| | | | | 375/240.12 |
| 2016/0227253 A1* | 8/2016 | Sato | ................. | H04N 19/159 |

OTHER PUBLICATIONS

Mukherjee et al., (hereinafter Mukherjee—NPL) "A Switchable Loop-Restoration With Side Information Framework for the Emerging AV1 Video Coding"; 978-1-5090-2175-8; (c) 2017 IEEE (Year: 2017) (Year: 2017).*

* cited by examiner

LOOP RESTORATION FILTERING FOR SUPER RESOLUTION VIDEO CODING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In loop filtering including deblock filtering and other restoration filtering is an important feature in modern video coding standards. Such filtering improves both objective and subjective video quality and compression efficiency. In the standards, parameters are defined to regulate such filtering operations. However, in implementation, parameter selection techniques may be left undefined.

It may be advantageous to improve filter coefficient selection for in loop filtering to provide improved compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 illustrates example pixel values of target pixel and neighboring pixels;

FIG. 4 illustrates example filter taps of an exemplary restoration filter;

DETAILED DESCRIPTION

Figure 1:
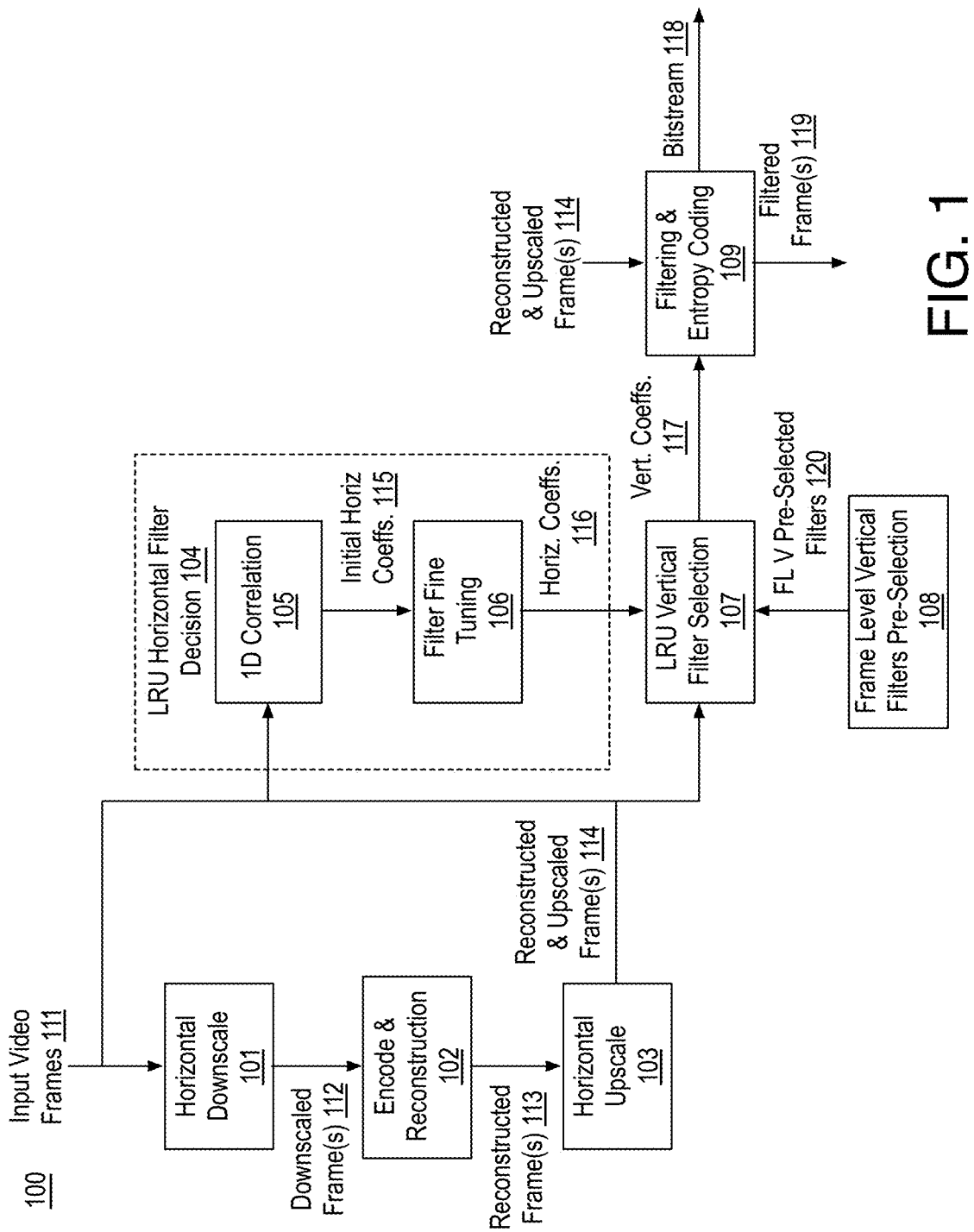
FIG. 1 is an illustrative diagram of an example system for video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to selecting filter coefficients for restoration filtering in super resolution video coding contexts.

As described above, in modern video coding standards, in loop filtering is an important feature that can provide improved efficiency and/or video quality. As discussed herein, techniques include receiving a reconstructed video frame that has been downscaled in one dimension (e.g., horizontally). That is, prior to encode and reconstruction, an input video frame (e.g., a 4K×2K video frame) is downscaled in one dimension. The downscaled video frame is encoded to generate a reconstructed (downscaled) video frame that, although being reconstructed, would not be suitable for display due to the downscaling. The downscaled video frame is then upscaled in the one dimension (e.g., horizontally) using, for example, linear upscaling techniques. The reconstructed and upscaled video frame is then restoration filtered. The restoration filtering is performed at both the encode side and the decode side with the encode side determining and transmitting restoration filter coefficients for use at the decode side. At the decode side, after restoration filtering, the video frame is ready for display. At the encode side, the video frame is subsequently downscaled and stored to a frame buffer for use as a reference frame.

Such coding techniques may be characterized as super resolution coding since the encode (and decode) are performed mainly on downscaled video and the resultant reconstructed frame is upscaled (e.g., to super resolution) and filtered prior to display. Notably, a majority of the encode and decode processing is performed at the downscaled resolution with the upscaling and restoration filtering being performed in-loop at the encoder and decoder. As discussed herein, the selection of restoration filter coefficients is performed on a portion-by-portion basis for each video frame. That is, each reconstructed and upscaled video frame is divided into portions and restoration filter coefficients are determined for each portion. As used herein, the term portion is any 2-dimension (2D) region of a video frame having an array of pixel values therein. The pixel values may be luma values, chroma values, etc. The portions may be characterized as blocks, regions, units, etc. The portions may be any suitable size such as 64×64, 128×128, or 256×256 pixels. In an embodiment, for each portion of the reconstructed and upscaled video frame restoration filter coefficients for a first dimension (e.g., horizontal) of the restoration filter are determined without regard to the restoration filter coefficients for the second dimension (e.g., vertical). For example, determining the filter coefficients for the first dimension is based an evaluation that, for each pixel of the portion, uses only pixel values that are aligned with the first dimension (e.g., only horizontally aligned pixel values) without use of pixel values that are misaligned with the first dimension (e.g., vertically aligned pixel values and pixel values that are diagonal with respect to the first dimension are not used). Notably, pixel values of the reconstructed and upscaled video frame and the corresponding video frame are used in the evaluation but none are misaligned with the first dimension.

In particular, within the scope of the Alliance for Open Media (AOM), AOMedia Video 1 (AV1) is a next-generation video codec. In the context of AV1, horizontal super resolution coding includes a downscaling stage that downscales input video frames (e.g., source pictures or frames) into lower resolution horizontally. The downscaled input video frames are encoded using available coding tools. Subsequent to encode, the reconstructed video frame is upscaled to original resolution and an in-loop restoration filter (e.g., a wiener filter) is applied to restore details. The restoration filter coefficients are encoded in the bitstream on a per large or loop restoration unit (LRU) such that the decoder can repeat the filtering in preparation for display. For example, an LRU may be a portion of a video frame as discussed herein. Such restoration filter coefficients may be determined at the encoder and provided in the bitstream for the luminance plane and chrominance planes separately.

In some embodiments, the restoration filter is a 2D filter having 7 horizontal filter taps and 7 vertical filter taps. In an embodiment, the restoration filter is a 2D wiener filter consisting of a 7 tap horizontal filter and a 7 tap vertical filter. For each LRU of the reconstructed and upscaled video frame, restoration filter coefficients are selected and encoded. In some embodiments, such restoration filter coefficients are determined first for the horizontal filter using only, for each pixel of the portion, pixel values that are horizontally aligned with the first dimension. Notably, in determining the horizontal filter coefficients, all pixels (e.g., in both horizontal and vertical dimensions) may be used for evaluation. However, in the evaluation for each particular pixel, only pixel values along the horizontal dimension are used. In an embodiment, the horizontal filter coefficients are determined using only 1D correlation statistics (e.g., vertical correlation is not used). In another embodiment, a limited set of the available sets of horizontal filter coefficients are evaluated by applying only the horizontal filter portion of the restoration filter (without application of the vertical portion). Thereby, on a pixel by pixel basis only neighboring pixels in the horizontal dimension are used.

FIG. 1 is an illustrative diagram of an example system 100 for video coding, arranged in accordance with at least some implementations of the present disclosure. As shown in FIG. 1, system 100 includes a horizontal downscale module 101, an encode and reconstruction module 102, a horizontal upscale module 103, an LRU horizontal filter decision module 104, which may include a 1D correlation module 105 and a filter fine tuning module 106, an LRU vertical filter selection module 107, a frame level vertical filters pre-selection module 108, and a filtering and entropy encoding module 109. Although discussed herein with respect to horizontal downscaling, upscaling, and corresponding horizontal filter decisions (and secondary vertical filter selection), the techniques are not so limited and any suitable dimension may be used such as replacing the horizontal dimension with the vertical dimension and the vertical dimension with the horizontal dimension. Furthermore, the techniques are typically described with respect to LRUs for the sake of clarity of presentation and brevity. However, the discussed techniques may be applied to any video frame or picture portion including any blocks, units, slices, etc.

As shown, system 100 receives input video frames 111 for coding and system 100 may provide video compression to generate a bitstream 118 such that system 100 may be a video encoder implemented via a computer or computing device or the like. As discussed further herein, horizontal filter coefficients 116 (i.e., horizontal restoration filter coefficients for each LRU) and vertical filter coefficients 117 (i.e., vertical restoration filter coefficients for each LRU) are determined using, at least for horizontal filter coefficients 116, by using or evaluating, for each pixel of the LRU only pixel values that are horizontally aligned with the pixel. Indicators indicative of horizontal filter coefficients 116 and vertical filter coefficients 117 are coded, via the entropy encode portion of filtering and entropy encoding module 109 into bitstream 118. Furthermore, reconstructed and upscaled frame 114 is filtered to generate restoration filtered frame 119 via the restoration filter portion of filtering and entropy encoding module 109. It is noted that restoration filtered frame 119 is at the upscaled resolution and restoration filtered frame 119 is subsequently horizontally downscaled (e.g., by horizontal downscale module 101 or a similar module) and stored to a frame buffer for use as a reference frame by encode and reconstruction module 102. Notably, a decoder (not shown) may reconstruct restoration filtered frame 119 for presentment to a user. Bitstream 118 may be any suitable bitstream such as a standards compliant bitstream. For example, bitstream 118 may be AOMedia Video 1 (AV1) compliant. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 may include other modules or components not shown for the sake of clarity of presentation. For example, encode and reconstruction module 102 may include a partition module, a transform module, a quantization module, an intra prediction module, a motion estimation module, a motion compensation module, a sample adaptive offset (SAO) filtering module, a scanning module, etc., some of which are discussed with respect to FIG. 11 herein. In some examples, in system 100, the restoration filter portion of filtering and entropy encoding module 109 is implemented in a local decode loop that generates restoration filtered frames 119 that are horizontally downscaled and stored in a frame buffer (not shown) and used in the encoding process as reference pictures for motion estimation and compensation. Furthermore, the local decode loop may include an inverse quantization module, an inverse transform module, and an adder for combining reconstructed residual blocks with reference blocks.

As discussed, system 100 receives input video frames 111. Input video frames 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to frames, slices, and LRUs for the sake of clarity of presentation. However, such frames may be characterized as pictures, video pictures, sequences of pictures, video sequences, etc., such LRUs may be characterized as restoration units or blocks. For example, a picture or frame of color video data may include a luminance plane (e.g., pixel values for luminance) or component and two chrominance planes (e.g., pixel values for chrominance) or components at the same or different resolutions with respect to the luminance plane. Input video frames 111 may include pictures or frames that may be divided into blocks of any size, which contain data corresponding to blocks of pixels. Such blocks may include data from one or more planes or color channels of pixel data.

As shown, input video frames 111 are horizontally downscaled by horizontal downscale module 101 to generate downscaled frames 112 such that downscaled frames 112 are downscaled in the horizontal dimension to a lower resolution (e.g., fewer pixels and pixel values in the horizontal dimension with respect to input video frames 111). Notably, downscaled frames 112 are not downscaled in the vertical dimension. Input video frames 111 may be horizontally downscaled using any suitable technique or techniques. In an embodiment, input video frames 111 are horizontally downscaled to half the horizontal resolution such that downscaled frames 112 have half horizontal resolution with respect to input video frames 111. In an embodiment, input video frames 111 are 4K×2K pixels and downscaled frames 112 are 2K×2K pixels.

Downscaled frames 112 are provided to encode and reconstruction module 102, which performs encode to generate portions of bitstream 118 and local decode to generate reconstructed frames 113, which are at the same resolution as downscaled frames 112. Notably, each of reconstructed frames 113 has a corresponding downscaled frame 112 that is a reconstructed version thereof. Reconstructed frames 113 are provided to horizontal upscale module 103, which horizontally upscales reconstructed frames 113 to generate reconstructed and upscaled frames 114, which are at the same resolution as input video frames 111. Reconstructed frames 113 may be upscaled using any suitable technique or techniques such as linear upscaling techniques. Each of reconstructed and upscaled frames 114 corresponds to one of input video frames 111 and has the same resolution such that reconstructed and upscaled frames 114 are reconstructed and upscaled versions of input video frames 111.

Reconstructed and upscaled frames 114 and input video frame 111 are provided to LRU horizontal filter decision module 104 and, as needed, to LRU vertical filter selection module 107. Furthermore, reconstructed and upscaled frames 114 are provided to filtering and entropy encoding module 109 such that the filtering portion thereof applies restoration filtering thereto with each LRU of reconstructed and upscaled frames 114 being filtered according to the horizontal and vertical restoration filter coefficients provided by horizontal filter coefficients 116 and vertical filter coefficients 117.

For example, reconstructed and upscaled frames 114 are divided into LRUs and particular horizontal filter coefficients 116 and vertical filter coefficients 117 are determined for each LRU. Indicators of horizontal filter coefficients 116 and vertical filter coefficients 117 for each LRU are encoded into bitstream 118 using entropy encode techniques via filtering and entropy encoding module 109 and horizontal filter coefficients 116 and vertical filter coefficients 117 for each LRU are used to filter reconstructed and upscaled frames 114 to generate restoration filtered frames 119.

Figure 2:
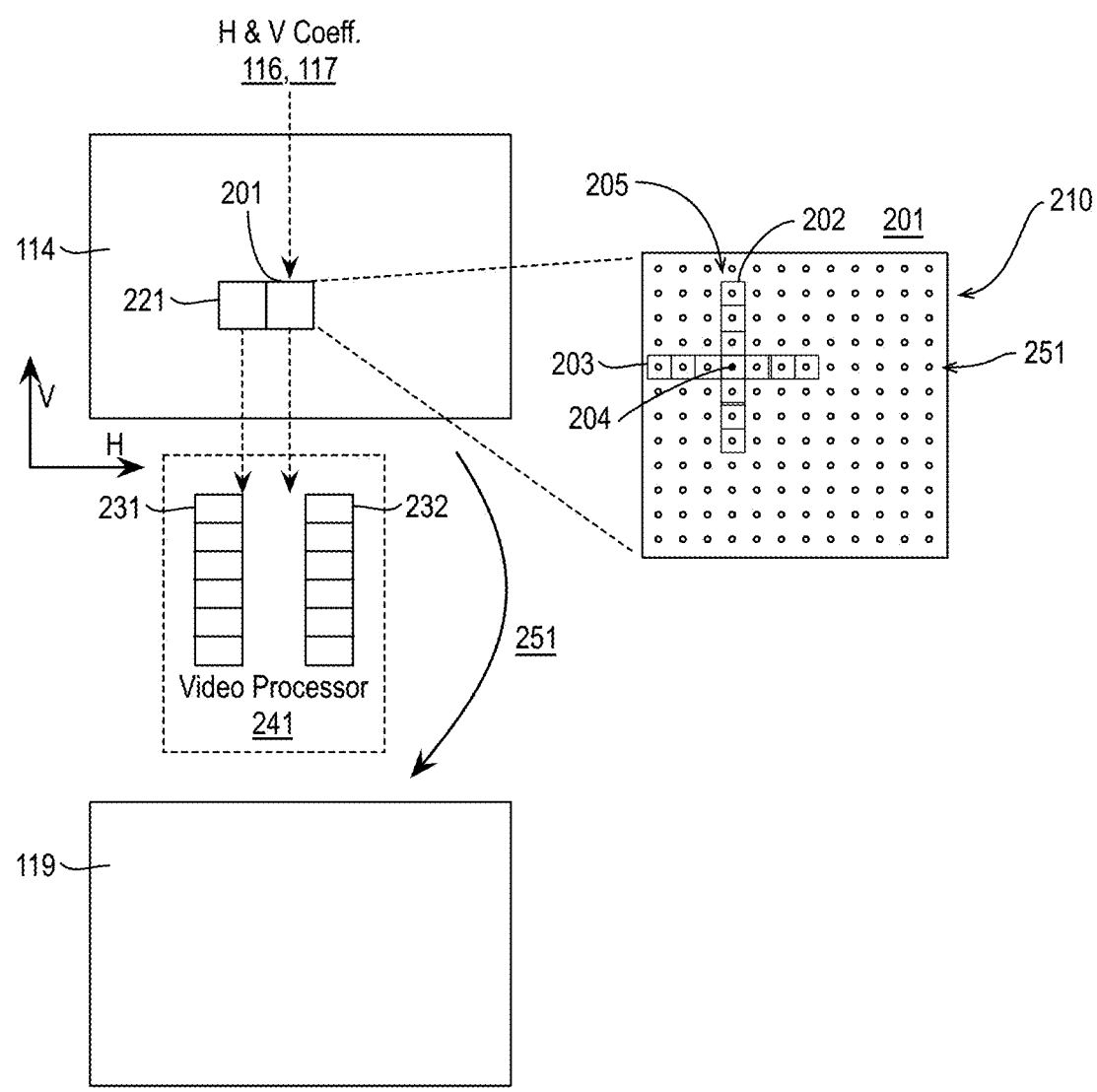
FIG. 2 illustrates an exemplary reconstructed and upscaled video frame and corresponding restoration filtered frame.

FIG. 2 illustrates an exemplary reconstructed and upscaled video frame 114 and corresponding restoration filtered frame 119, arranged in accordance with at least some implementations of the present disclosure. Reconstructed and upscaled video frame 114 is a reconstructed version of input video frame 111, which may include any picture of a video sequence or clip such as a VGA, HD, Full-HD, 4K, 5K, etc. video frame. Reconstructed and upscaled video frame 114 is segmented into LRUs as illustrated with respect to LRU 201 and LRU 221. For example, reconstructed and upscaled video frame 114 is fully segmented into LRUs, which are not shown for the sake of clarity of presentation. As shown with respect to LRU 201, each LRU includes an array of pixels 210 (e.g., having pixel values) extending in both the horizontal dimension and the vertical dimension. Furthermore, each LRU 201 has corresponding horizontal filter coefficients 116 and vertical filter coefficients 117 for application by restoration filter 205. That is, restoration filter 205 is applied to each of pixels 210 using horizontal filter coefficients 116 and vertical filter coefficients 117 for each filter tap thereof. As shown, restoration filter 205 has a vertical filter 202 and a horizontal filter 203. Restoration filter 205 may be any 2D separable filter (e.g., separable into vertical filter 202 and a horizontal filter 203). In an embodiment, restoration filter 205 is a wiener filter. In an embodiment, restoration filter 205 is a 2D symmetric separable wiener filter having 7 vertical filter taps and 7 horizontal filter taps.

As shown with respect to target pixel 204, each of pixels 210 is filtered using horizontal filter coefficients 116 and vertical filter coefficients 117 as implemented by horizontal filter 203 and vertical filter 202, respectively of restoration filter 205 using some neighboring pixels of pixels 210. As used herein, the term filter coefficient indicates a filter coefficient or strength applied to a particular filter tap. For example, a filter coefficient of zero would effectuate not using the pixel value under the tap for determining a filtered pixel value of a target pixel 204 and a filter coefficient of one would effectuate full use the pixel value under the tap for determining the filtered pixel value of target pixel 204 (assuming the filter coefficients sum to one). As shown, to determine a filtered pixel value of target pixel 204, vertical filter 202 uses only pixel values aligned with the vertical (V) dimension and horizontal filter 202 uses only pixel values aligned with the horizontal (H) dimension.

Figures 3, 4:
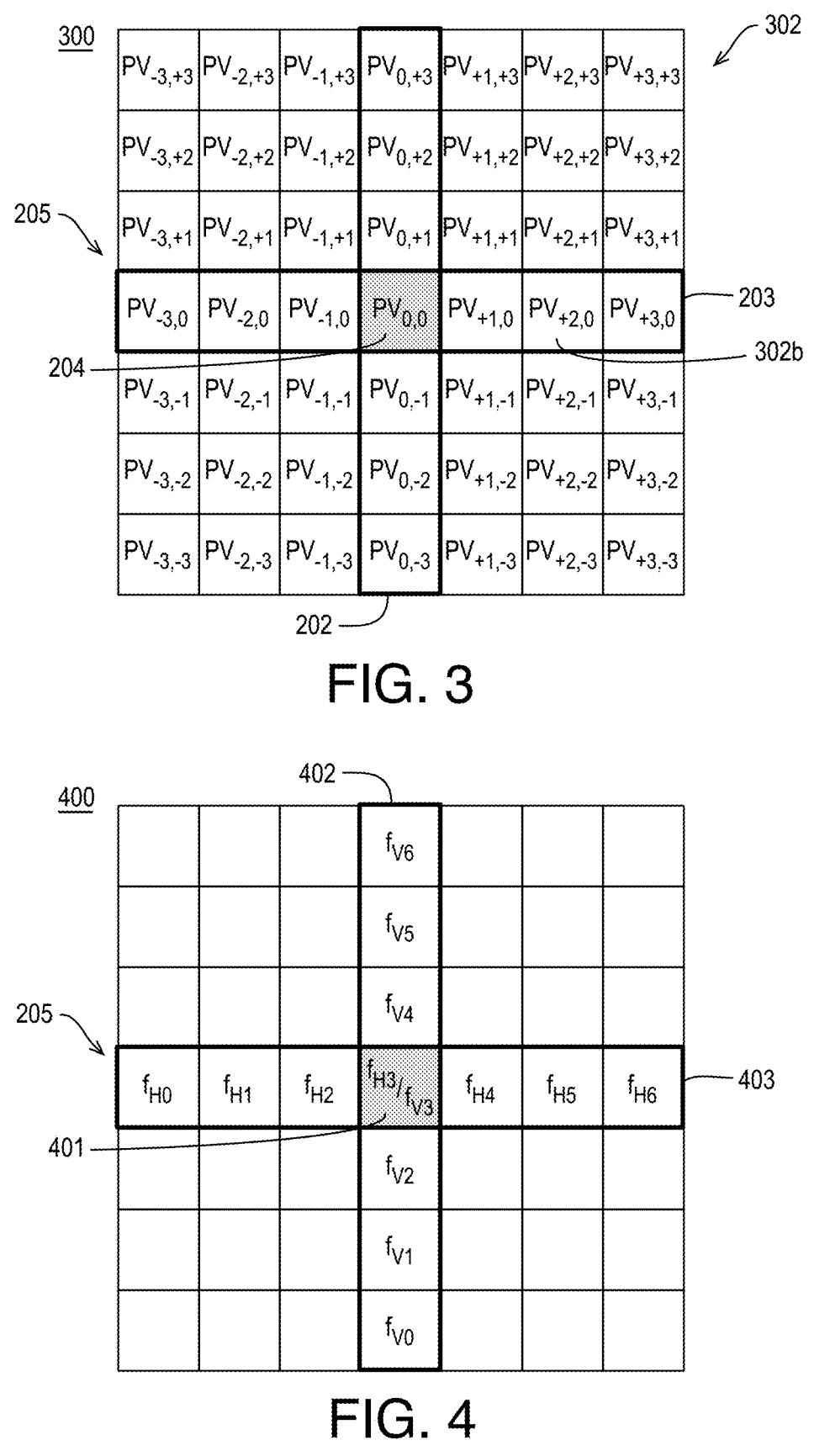

FIG. 3 illustrates example pixel values 300 of target pixel 204 and neighboring pixels 302, arranged in accordance with at least some implementations of the present disclosure. As shown in FIG. 3, target pixel 204 (e.g., a pixel to be filtered) has a pixel value, $PV_{0,0}$ and is surrounded by neighboring pixels 302 having pixel values labeled based on their position with respect to target pixel 204 with +1 being one pixel position to the right (e.g., horizontally displaced) or up (e.g., vertically displaced), −3 being three pixel positions left or down, and so on such that, for example, neighboring pixel 302b has a pixel value of $PV_{+2,0}$. In the example of FIG. 3, target pixel 204 is being filtered by horizontal filter 203 and vertical filter 202 of restoration filter 205.

FIG. 4 illustrates example filter taps 400 of an exemplary restoration filter 205, arranged in accordance with at least some implementations of the present disclosure. As shown in FIG. 3, horizontal filter taps 403 having corresponding horizontal filter coefficients (labeled $f_{H0-6}$) are applied along the horizontal dimension and vertical filter taps 402 having corresponding vertical filter coefficients (labeled $f_{V0-6}$) are applied along the vertical dimension. When restoration filter 205 is applied to pixel values 300, the new or filtered value for target pixel 204 is determined by applying restoration filter 205 (e.g., a wiener filter) according to the filter coefficients defined by horizontal filter coefficients 116 and vertical filter coefficients 117 as discussed herein. Such coefficients may provide pixel value weighting during the filtering for example. It is noted that a filter tap 401 is also located at target pixel 204 (and a corresponding weight is used). Typically, the corresponding coefficient value may be derived by having the sum of all of vertical and horizontal filter coefficients sum to one. In some embodiments, horizontal filter 203 and vertical filter 202 are applied separately. In such embodiments, the horizontal filter coefficient value for filter tap 401 provides for a summing of one for the horizontal filter coefficients and, likewise, the vertical filter coefficient value for filter tap 401 provides for a summing of one for the vertical filter coefficients.

Furthermore, as discussed, in some embodiments, horizontal filter 203 and vertical filter 202 are symmetric filters such that $f_{H0}=f_{H6}$, $f_{H1}=f_{H5}$, $f_{H2}=f_{H4}$, $f_{V0}=f_{V6}$, $f_{V1}=f_{V5}$, and $f_{V2}=f_{V4}$. In such embodiments, for each of horizontal filter 203 and vertical filter 202, only three coefficients need to be indicated in bitstream. For example, for horizontal filter 203, if $f_{H0}$, $f_{H1}$, and $f_{H2}$ are indicated, $f_{H6}$, $f_{H5}$, and $f_{H4}$ may be derived therefrom (e.g., $f_{H0}=f_{H6}$, $f_{H1}=f_{H5}$, $f_{H2}=f_{H4}$ and $f_{H3}=-2*(f_{H0}+f_{H1}+f_{H2})$).

Returning to FIG. 2, horizontal filter coefficients 116 and vertical filter coefficients 117 for each LRU as applied by restoration filter 205 are used to restoration filter reconstructed and upscaled frame 114 as shown by restoration filter operation 251 to generate restoration filtered frame 119. Notably, the processing for LRUs such as LRU 201 and LRU 221 may be multi-threaded for simultaneous processing as indicated by threads 231, 232 as provided by video processor 241. In particular, selection of horizontal filter coefficients 116 and vertical filter coefficients 117 and/or their application via restoration filter 205 are performed at least partially in parallel by threads 231, 232 as implemented by video processor 241. For example, selection of horizontal filter coefficients 116 and vertical filter coefficients 117 for LRU 201 and LRU 221 (or more LRUs) may be performed at least partially simultaneously. In addition or in the alternative, application of horizontal filter coefficients 116 and vertical filter coefficients 117 via restoration filter 205 for LRU 201 and LRU 221 (or more LRUs) may be performed at least partially simultaneously.

Returning now to FIG. 1, as discussed, horizontal filter coefficients 116 and vertical filter coefficients 117 for each LRU are used to filter reconstructed and upscaled frames 114 to generate restoration filtered frames 119. As shown, in a first stage, LRU horizontal filter decision module 104 determines horizontal filter coefficients 116 for each LRU of a frame based on input video frames 111 and reconstructed and upscaled video frame 114. In embodiments where the reconstruction filter (e.g., restoration filter 205) is a wiener filter that is symmetrical, horizontal filter coefficients 116 and vertical filter coefficients 117 may be signed integer values and, as discussed, only three horizontal filter coefficients 116 and three vertical filter coefficients 117 need to be indicated in bitstream 118 per LRU.

In an embodiment, 1D correlation module 105 determines initial horizontal coefficients 115 by evaluating 1-dimensional (1D) correlation (e.g., only in the horizontal dimension) between an LRU and original pixel values of input video frames 111 and the available coefficient values for horizontal filter 203. In an embodiment, for each pixel of an LRU, 1D autocorrelation and cross correlation are determined. As discussed, such correlation is 1D such that, for each pixel, only pixel values aligned along the 1D are used for the correlation. Using such techniques, an autocorrelation matrix (e.g., an autocorrelation value for each pixel of the LRU) and a cross-correlation vector (e.g., a cross correlation value for each horizontal line of the LRU) are generated for the current LRU. For example, with reference to FIG. 2, for target pixel 204, autocorrelation and cross-correlation is performed using only pixel values of pixels 251 in horizontal alignment with target pixel 204 and pixel values of input video frames 111 (not shown) that are collocated (i.e., in the same position but a different frame) with pixels 251. Using such autocorrelation and cross-correlation data or statistics, initial horizontal filter coefficients 115 are determined. In an embodiment, initial horizontal filter coefficients 115 are determined by calculating the autocorrelation, for each pixel, of the current LRU (e.g., using pixel values of reconstructed and upscaled frames 114) and the cross-correlation of the current LRU (e.g., using pixel values of reconstructed and upscaled frames 114) with the original pixel values from input video frames 111 and solving Equation (1) for the filter, h (e.g., the initial horizontal filter coefficients 115):

$$\begin{bmatrix} R_{xx}[0] & R_{xx}[-1] & \ldots & R_{xx}[1-N] \\ R_{xx}[1] & R_{xx}[0] & \ldots & R_{xx}[2-N] \\ \vdots & \vdots & \ddots & \vdots \\ R_{xx}[N-1] & R_{xx}[N-2] & \ldots & R_{xx}[0] \end{bmatrix} \begin{bmatrix} h[0] \\ h[1] \\ \vdots \\ h[N-1] \end{bmatrix} = \begin{bmatrix} R_{yx}[0] \\ R_{yx}[1] \\ \vdots \\ R_{yx}[N-1] \end{bmatrix} \quad (1)$$

where $R_{xx}$ are autocorrelation values, $R_{yx}$ are cross-correlation values for the target pixel, and h are initial horizontal filter coefficients. In an embodiment, autocorrelation, $R_{xx}$, is determined as $R_{xx}[m]=E\{x[n]x[n+m]\}$ and cross correlation is determined as $R_{yx}[m]=E\{x[n]y[n+m]\}$, where E is the expectation.

Initial horizontal filter coefficients 115 may be optionally refined by filter fine tuning module 106. In an embodiment, filter fine tuning module 106 evaluates a neighborhood of integer values around initial horizontal filter coefficients 115. In an embodiment, for each horizontal filter coefficient of initial horizontal filter coefficients 115, a value of +/0/−1 is evaluated for each unique horizontal filter coefficient. As discussed, three horizontal filter coefficients of initial horizontal filter coefficients 115 are unique (i.e., $f_{H0}$ or $f_{H6}$, $f_{H1}$ or $f_{H5}$, and $f_{H2}$ or $f_{H4}$) and the others may be derived from those three horizontal filter coefficients. Therefore, by testing a value of +/0/−1 for each of the three horizontal filter coefficients, a variety of horizontal filters are compared: the original horizontal filter along with all permutations +/0/−1 for $f_{H0}$ and $f_{H6}$, +/0/−1 for $f_{H1}$ and $f_{H5}$, and +/0/−1 for $f_{H2}$ and $f_{H4}$. Such filters may be tested using any suitable technique or techniques. In an embodiment, the filters are applied to the current LRU and the pixel values of the filtered current LRUs are compared to the collocated pixel values of the LRU in input video frame 111 with the horizontal filter having lowest distortion (e.g., smallest sum of squares of differences) being selected. As discussed, in an embodiment values of +1/0/−1 are evaluated for each of the three horizontal filter coefficients. In another embodiment, values of +2/+1/0/−1/−2 are evaluated for each of the three horizontal filter coefficients. The horizontal filter coefficients of the selected horizontal filter are provided as final horizontal filter coefficients 116. Notably, such filtering includes evaluation using only pixel values that are aligned with the horizontal dimension (e.g., as no vertical filtering is applied).

As shown, at a second stage, vertical filter coefficients 117 are selected by LRU vertical filter selection module 107. In an embodiment, the LRU as filtered by the final horizontal filter coefficients 116 are used for evaluation by frame level (FL) vertical (V) pre-selected filters 120 as provided by frame level vertical filters pre-selection module 108. Frame level vertical pre-selected filters 120 are a subset of all available vertical filters and each vertical filter includes filter coefficients for application by vertical filter 202 (please refer to FIG. 2). In an embodiment, frame level vertical pre-selected filters 120 include four filter options: a first filter where $f_{V0}=f_{V6}=0$, $f_{V1}=f_{V5}=1$, and $f_{V2}=f_{V4}=-2$; a second filter where $f_{V0}=f_{V6}=0$, $f_{V1}=f_{V5}=-1$, and $f_{V2}=f_{V4}=-2$, a third filter where $f_{V0}=f_{V6}=0$, $f_{V1}=f_{V5}=0$, and $f_{V2}=f_{V4}=-1$, and a fourth filter where $f_{V0}=f_{V6}=f_{V1}=f_{V5}=1=f_{V2}=f_{V4}=0$ (e.g., no vertical filter is applied). In an embodiment, frame level vertical pre-selected filters 120 include twenty-five filter options such that $f_{V0}=f_{V6}=0$ for all options, $f_{V1}=f_{V5}=-2, -1, 0, 1, 2$, and $f_{V2}=f_{V4}=-2, -1, 0, 1, 2$.

The final filter from among the available filters may be selected using any suitable technique or techniques. In an embodiment, frame level vertical pre-selected filters 120 are applied to the current horizontally filtered LRU and the pixel values of the vertically and horizontally filtered current LRUs are compared to the collocated pixel values of the LRU in input video frame 111 with the vertical filter of frame level vertical pre-selected filters 120 having lowest distortion (e.g., smallest sum of squares of differences) being selected.

Frame level vertical pre-selected filters 120 may include any suitable available vertical filters. In an embodiment, frame level vertical pre-selected filters 120 are available at a frame level such that any LRU of a current frame may select a vertical filter from frame level vertical pre-selected filters 120.

Figure 5:
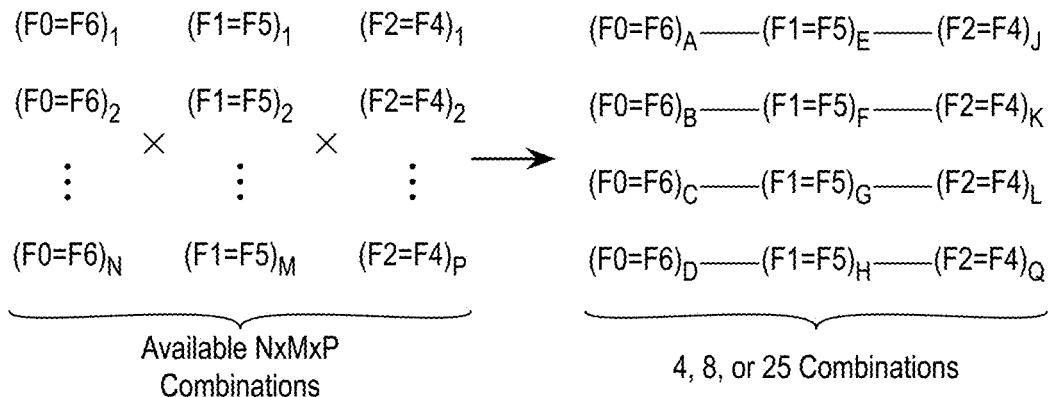
FIG. 5 illustrates an example data structure indicating selection of frame level 1D pre-selected filter combinations from available 1D filter combinations.

FIG. 5 illustrates an example data structure 500 indicating selection of frame level (FL) 1D pre-selected filter combinations 502 from available 1D filter combinations 501, arranged in accordance with at least some implementations of the present disclosure. As shown in FIG. 5, any number (e.g., 4, 8, or 25) of frame level 1D pre-selected filter combinations 502 may be selected from available 1D filter combinations 501 such that frame level 1D pre-selected filter combinations 502 are a subset of available 1D filter combinations 501. As used herein, the term subset indicates the group is a set of which all elements thereof are members of another set. In this context, each element or member (e.g., filter coefficient combination) of frame level 1D pre-selected filter combinations 502 is a member of available 1D filter combinations 501. For example, available 1D filter combinations 501 may include any number, N, of filter coefficient values for filter taps immediately adjacent to a target pixel (e.g., F2, F4), any number, M, of filter coefficient values for filter taps one tap away from a target pixel (e.g., F1, F5), and any number, P, of filter coefficient values for filter taps two taps away from a target pixel (e.g., F0, F6), and so on. In such an embodiment, available 1D filter combinations 501 include N×M×P available combinations of filter coefficients. It is noted that FIG. 5 is illustrated with respect to either horizontal or vertical filters.

In an embodiment, frame level 1D pre-selected filter combinations 502 are selected from available 1D filter combinations 501 to limit the number of filter combinations to be tested. For example, from available 1D filter combinations 501, a number (e.g., 4, 8, or 25 in the illustrated example, although any number less than the number of available 1D filter combinations 501 may be used) of frame level 1D pre-selected filter combinations 502 are selected. In the illustrated example, four frame level 1D pre-selected filter combinations 502 are illustrated such that each has a filter coefficient value for filter taps immediately adjacent to a target pixel (e.g., F2, F4) (indicated as A, B, C, D, respectively), each has a filter coefficient value for filter taps one tap away from a target pixel (e.g., F1, F5) (indicated as E, F, G, H, respectively), and each has a filter coefficient value for filter taps two taps away from a target pixel (e.g., F0, F6) (indicated as J, K, L, Q, respectively). Combinations 502 may include any unique combinations of filter coefficients. In an embodiment, frame level 1D pre-selected filter combinations 502 are provided as frame level vertical pre-selected filters 120 for vertical filtering.

As discussed, in some embodiments, vertical filter coefficients 117 are selected by LRU vertical filter selection module 107. In another embodiment, application of a vertical filter is skipped. For example, no vertical filter may be applied or tested. In such embodiments, values of zero for each of vertical filter coefficients 117 are indicated in bitstream 118. For example, vertical filter coefficient may be bypassed or skipped in response to a frame level skip or bypass indicator from an encode controller (not shown).

Figure 6:
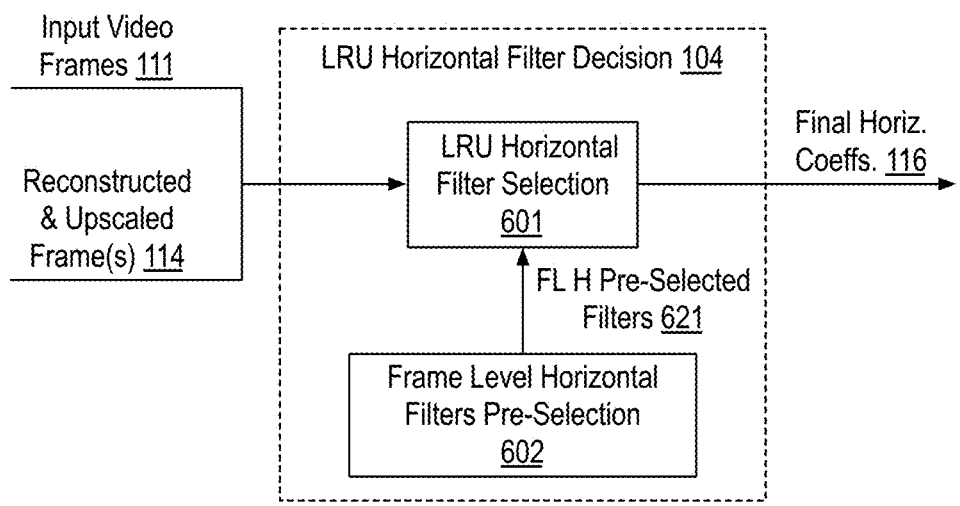
FIG. 6 illustrates another example LRU horizontal filter decision module.

FIG. 6 illustrates another example LRU horizontal filter decision module 104, arranged in accordance with at least some implementations of the present disclosure. As shown in FIG. 6, in some embodiments, LRU horizontal filter decision module 104 includes an LRU horizontal filter selection module 601 and a frame level horizontal filters pre-selection module 602, which may operate in a similar manner as discussed with respect to LRU vertical filter selection module 107 and frame level vertical filters pre-selection module 108. In an embodiment, for each LRU of reconstructed and upscaled frames 114, frame level (FL) horizontal (H) pre-selected filters 621 as provided by frame level horizontal filters pre-selection module 602 are evaluated. Frame level horizontal pre-selected filters 621 are a subset of all available horizontal filters and each of available filters includes filter coefficients for application by horizontal filter 203 (please refer to FIG. 2). In an embodiment, frame level horizontal pre-selected filters 621 include twenty-five filter options such that $f_{H0}=f_{H6}=0$ for all options, $f_{H1}=f_{H5}=-2, -1, 0, 1, 2$, and $f_{H2}=f_{H4}=-2, -1, 0, 1, 2$. In an embodiment, frame level horizontal pre-selected filters 621 include four filter options: a first filter where $f_{H0}=f_{H6}=0$, $f_{H1}=f_{H5}=1$, and $f_{H2}=f_{H4}=-2$; a second filter where $f_{H0}=f_{H6}=0$, $f_{H1}=f_{H5}=-1$, and $f_{H2}=f_{H4}=-2$, a third filter where $f_{H0}=f_{H6}=0$, $f_{H1}=f_{H5}=0$, and $f_{H2}=f_{H4}=-1$, and a fourth filter where $f_{H0}=f_{H6}=f_{H1}=f_{H5}=1=f_{H2}=f_{H4}=0$ (e.g., no horizontal filter is applied).

The final horizontal filter from among frame level horizontal pre-selected filters 621 may be selected using any suitable technique or techniques. In an embodiment, frame level horizontal pre-selected filters 621 are applied to the current LRU and the pixel values of the horizontally filtered current LRUs (e.g., one for each of frame level horizontal pre-selected filters 621) are compared to the collocated pixel values of the LRU in input video frame 111 with the horizontal filter of frame level pre-selected filters 621 having lowest distortion (e.g., smallest sum of squares of differences) being selected.

As discussed, frame level horizontal pre-selected filters 621 may include any suitable available horizontal filters. In an embodiment, frame level horizontal pre-selected filters 621 are available at a frame level such that any LRU of a current frame may select a horizontal filter from frame level horizontal pre-selected filters 621. Furthermore, any data structure, 1D filter combinations 501, and frame level 1D pre-selected filter combinations 502 discussed with respect to FIG. 5 may be applied with respect to frame level horizontal pre-selected filters 621. For example, FIG. 5 provides a discussion relevant to either horizontal or vertical filter selection.

Figure 7:
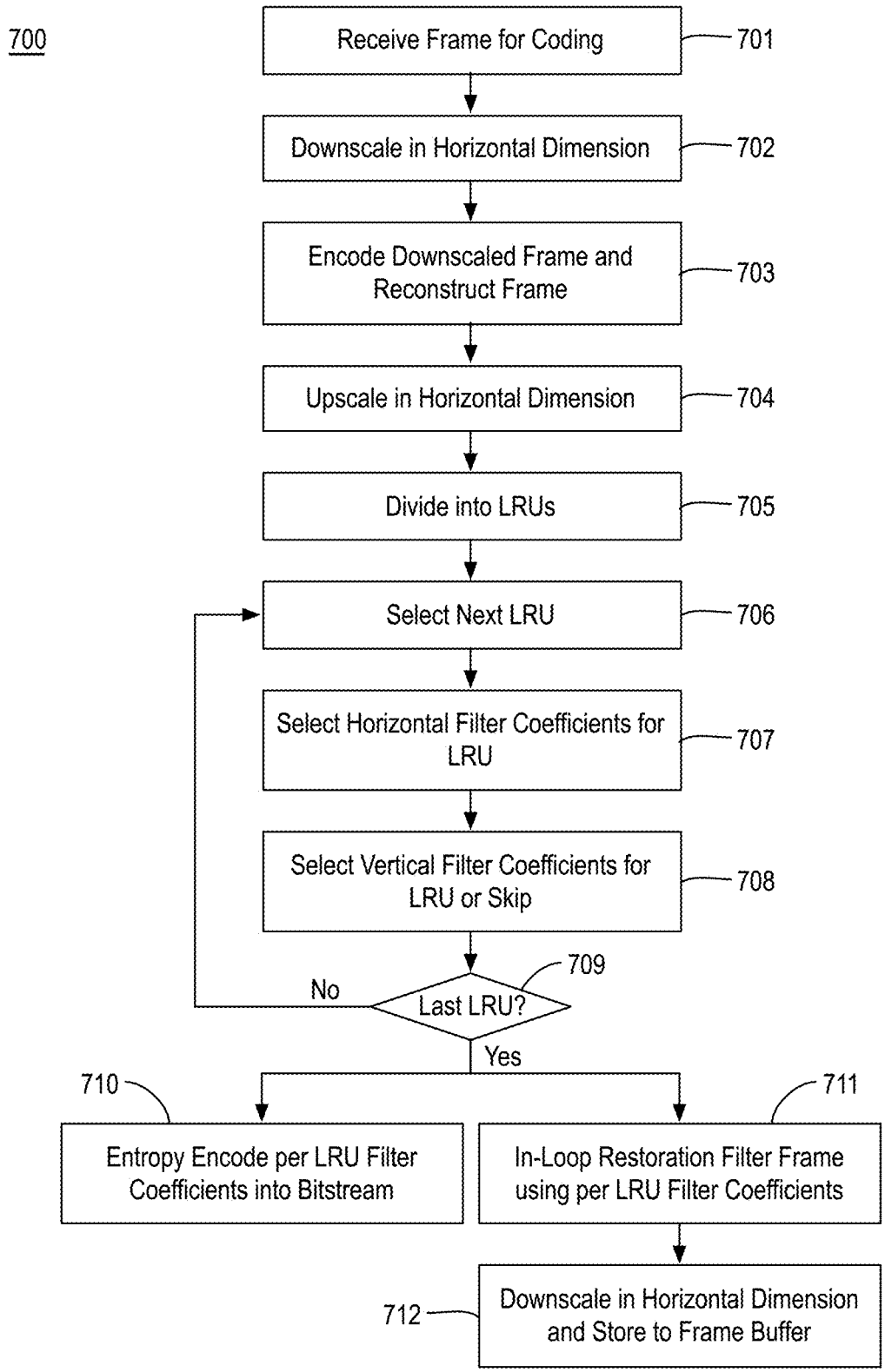
FIG. 7 is a flow diagram illustrating an example process for video coding including selecting horizontal restoration filter coefficients for a reconstructed and upscaled frame.

FIG. 7 is a flow diagram illustrating an example process 700 for video coding including selecting horizontal restoration filter coefficients for a reconstructed and upscaled frame, arranged in accordance with at least some implementations of the present disclosure. Process 700 may include one or more operations 701-712 as illustrated in FIG. 7. Process 700 may be performed by a device (e.g., system 100 as discussed herein) to encode input video.

Process 700 begins at operation 701, where a video frame is received for coding using any suitable technique or techniques. Processing continues at decision operation 702, where the video frame is downscaled in only the horizontal dimension to generate a downscaled video frame. The video frame may be downscaled in only the horizontal dimension using any suitable technique or techniques. Processing continues at decision operation 703, where the downscaled video frame is encoded and a reconstructed version of the downscaled video frame is generated. The reconstructed downscaled video frame may be generated using any suitable technique or techniques. For example, blocks of the downscaled video frame may be differenced with intra- or inter-predicted blocks and the resultant residual block may be transformed, quantized, and encoded into a bitstream. The resultant quantized transform coefficients may be inverse quantized and inverse transformed and added to the corresponding intra- or inter-predicted block to generate a reconstructed block. The reconstructed blocks for the video frame are combined, and optionally deblock filtered and/or constrained directional enhancement filtered (CDEF) to provide a reconstructed frame.

Processing continues at operation 704, where the reconstructed frame is upscaled in only the horizontal dimension to return to the resolution of the video frame received at operation 701. The reconstructed video frame may be upscaled in only the horizontal dimension using any suitable technique or techniques. Processing continues at operation 705, where the reconstructed and upscaled video frame is divided into LRUs (or portions) of any suitable size such as 64×64, 128×128, or 256×256 pixels.

Processing continues at operation 706, where a next (or first) LRU is selected for processing. Processing continues at operation 707, where only horizontal filter coefficients are selected for the LRU for a 2D restoration filter to be applied to the LRU. For example, horizontal filter coefficients are selected without regard to the vertical component of the 2D restoration filter. The 2D restoration filter may be any suitable 2D filter such as a 2D separable symmetric wiener filter. The horizontal filter coefficients are selected using any techniques discussed herein. In an embodiment, the horizontal filter coefficients are determined based on only horizontal 1D autocorrelation and cross correlation statistics for the current LRU (and using the corresponding LRU of the video frame received at operation 701; that is, original pixel values). Processing continues at operation 708, where vertical filter coefficients are selected for the 2D restoration filter. The vertical filter coefficients may be selected using any suitable technique or techniques. In an embodiment, the vertical filter coefficients are selected from a subset of available filter coefficient sets as discussed herein. For example, each set of the subset may be applied to the horizontal filtered LRU and the vertical filter coefficients providing the lowest distortion with respect to the corresponding LRU of the video frame received at operation 701 are selected. In an embodiment, selection of vertical restoration coefficients is skipped and no such coefficients are used. Notably, such techniques provide low complexity and high efficiency processing without significant visual quality costs. Processing continues at decision operation 709, where a determination is made as to whether the current LRU is the last LRU of the current reconstructed and upscaled video frame. If not, processing continues at operations 706-708 for the next LRU.

Notably, the discussed techniques provide a low complexity and high quality filter coefficient selection process for super resolution coding that improves a device implementing video coding with respect to improved processing efficiency, improved power usage, and improved subjective and objective video quality coding. For example, the discussed techniques reduce the number of multiplication operations from about 1500 to less than 100 for each pixel of the LRU. Furthermore, although operations 706-709 are discussed in a serial manner for the sake of clarity of presentation, operations 706-709 may be performed in parallel or at least partially simultaneously for two or more LRUs. Notably, the discussed techniques avoid iterative search processes in determining the restoration filter coefficients, which enables parallel multi-threading can be applied on each LRU. In addition, the discussed techniques offer much lower complexity of exhaustive filter coefficient evaluation while maintaining comparable visual experience.

As discussed, in an embodiment, operation 707 includes selection of the horizontal filter coefficients based on only horizontal 1D autocorrelation and cross correlation statistics. In another embodiment, operation 707 includes selection of the horizontal filter coefficients from a subset of available horizontal filter coefficient sets. For example, each set of the subset may be applied to the LRU and the horizontal filter coefficients (e.g., from the sets) providing the lowest distortion with respect to the corresponding LRU of the video frame received at operation 701 are selected. Notably, such techniques may be advantageous in applications with extremely low complexity requirements. For example, the horizontal filter is selected from a set of predefined horizontal filters such that the selected horizontal filter is the one with minimum cost. In such embodiments, processing continues at operations 708 and 709 as discussed above.

When the last LRU has been processed, processing continues at operation 710, where the per LRU filter coefficients are coded into a bitstream, and at operation 711, where the reconstructed and upscaled video frame is restoration filtered by applying, via the restoration filter, the per LRU filter coefficients to the reconstructed and upscaled video frame. For example, the restoration filtering may restore details via application of the restoration filter (e.g., a wiener filter). Processing continues from operation 711 at operation 712, where the restored video frame is downscaled, using the same techniques used at operation 702, and stored into a frame buffer for use as a reference frame (e.g., for motion compensation inter-prediction) in the encode and reconstruction operations discussed with respect to operation 703.

In some embodiments, the operations discussed herein are applied separately to the luma plane and chroma planes of the discussed video frames. That is, for each LRU, horizontal and vertical components for the restoration filter are generated separately for each of the luma plane (or channel), a first chroma plane (or channel), and a second chroma plane (or channel). The discussed techniques may be applied in any combination to the luma and first and second chroma planes. In an embodiment, selection of horizontal filter coefficients are determined using 1D correlation for the luma plane while the horizontal filter coefficients are selected from preselected subsets for the chroma planes. In addition or in the alternative, in some embodiments, selection of vertical filter coefficients are determined using preselected subsets for the luma plane while vertical filter coefficient selection is skipped for the chroma planes. In some embodiments, the luma and chroma planes use the same techniques. Furthermore, among the luma and chroma planes, the horizontal and/or vertical preselected filter options may be the same or they may be different. In an embodiment, both the horizontal and/or vertical preselected filter options include more options for the luma plane than for the chroma planes.

Figure 8:
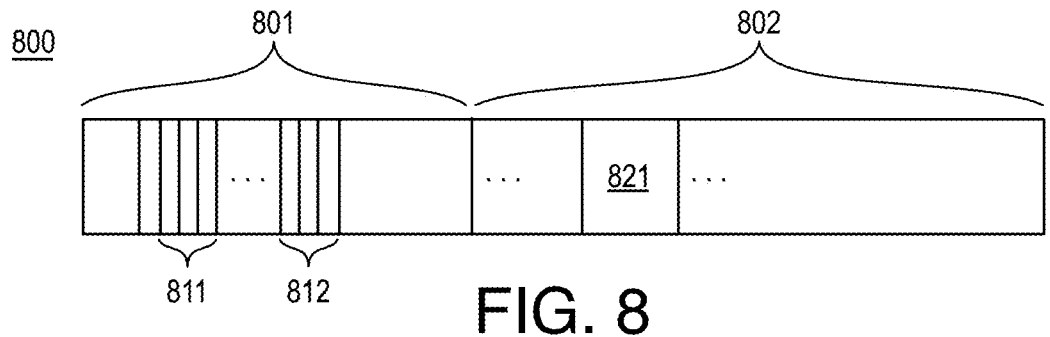
FIG. 8 illustrates an example bitstream indicating selected horizontal and vertical restoration filter coefficients for a frame.

FIG. 8 illustrates an example bitstream 800 indicating selected horizontal and vertical restoration filter coefficients for a frame, arranged in accordance with at least some implementations of the present disclosure. In some examples, bitstream 800 may correspond to bitstream 118 as discussed elsewhere herein. As shown in FIG. 8, in some embodiments, bitstream 800 includes a header portion 801 and a data portion 802. In an embodiment, header portion 801 includes a frame header 811 and a slice header 812. In an embodiment, both frame header 811 and slice header 812 are implemented via header portion 801. In an embodiment, frame header 811 and slice header 812 may be separated by a data portion.

Indicators corresponding to frame level loop restoration filter selection for a particular frame are implemented or inserted in frame header 811. In an embodiment, per LRU horizontal filter coefficients 116 and vertical filter coefficients 117 are coded with each LRU in data portion 802 (e.g., in the bitstream). Furthermore, data portion 802 may include encoded picture data 821 for coded pictures such that encoded picture data 821 includes, for example, encoded quantized transform coefficients, motion vectors, intra-prediction indicators, and per LRU horizontal filter coefficients 116 and vertical filter coefficients 117 as discussed herein.

Figure 9:
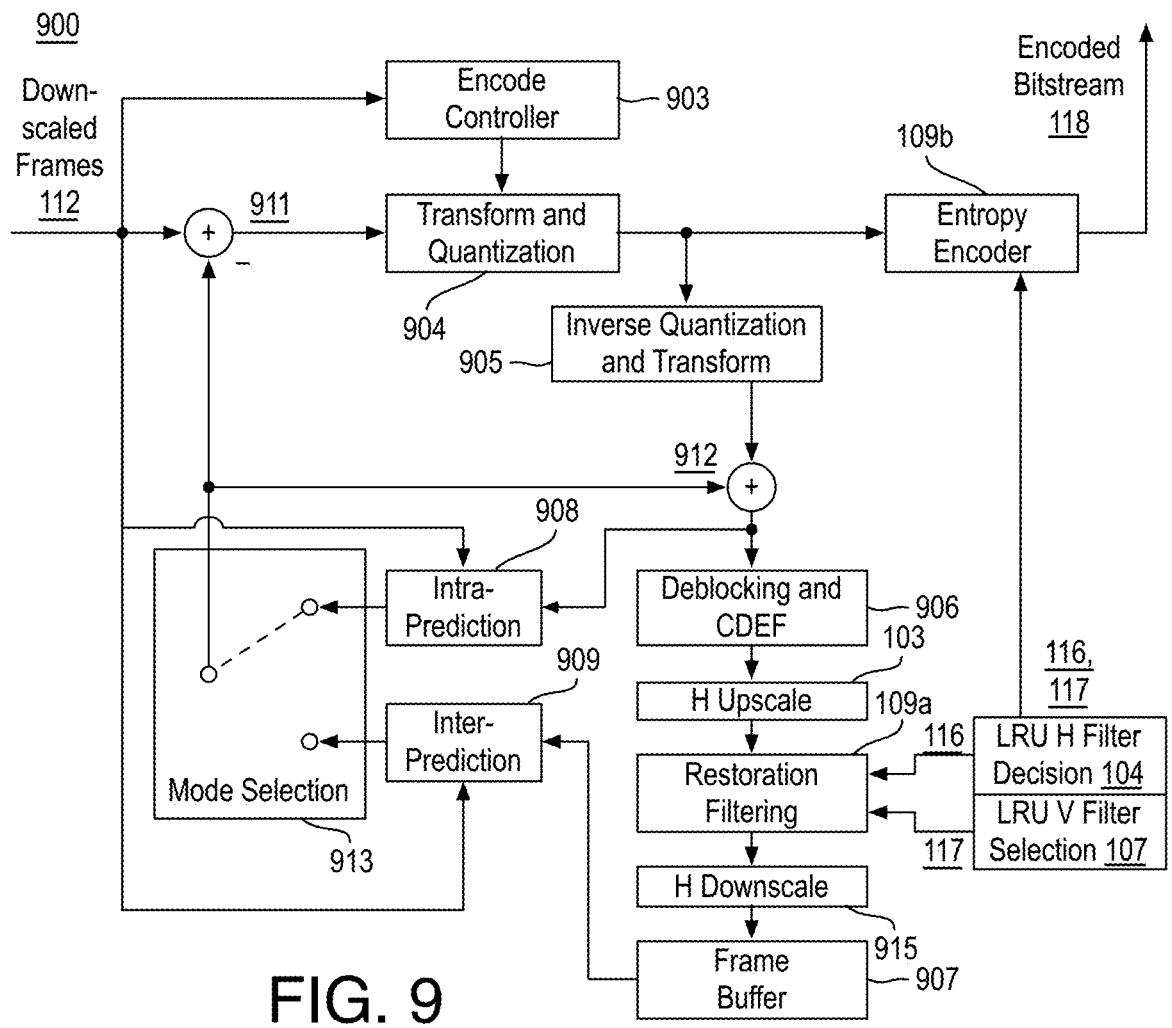
FIG. 9 illustrates a block diagram of an example encoder integrating selection of restoration filter coefficients for a frame.

FIG. 9 illustrates a block diagram of an example encoder 900 integrating selection of restoration filter coefficients for a frame, arranged in accordance with at least some implementations of the present disclosure. As shown, encoder 900 includes LRU horizontal filter decision module 104, LRU vertical filter selection module 107, filtering and entropy encoding module 109 (separated into a restoration filtering module 109a and an entropy encoder 109b), an encode controller 903, a transform and quantization module 904, an inverse quantization and transform module 905, a deblocking and CDEF filtering module 906, a frame buffer 907, an intra-prediction module 908, an inter-prediction module 909, a mode selection module 913, horizontal upscale module 103, and horizontal downscale module 915. Encoder 900 may include additional modules such as other modules of system 100 and/or interconnections that are not shown for the sake of clarity of presentation.

As shown in FIG. 9, encoder 900 may receive downscaled video frames 112 (e.g., horizontally downscaled versions of input video frames 111). As discussed herein, input video frames 111 may be in any suitable format and may be horizontally downscaled via any suitable technique. Input video frames 111 may be attained using any suitable technique or techniques such as video capture or via memory or the like. As shown, downscaled video frames 112 are provided to encode controller 903, intra-prediction module 908, and inter-prediction module 909. The coupling to intra-prediction module 908 or inter-prediction module 909 may be made via mode selection module 913 as shown. For example, mode selection module 913 may make final mode decisions for encoding portions of video frames of downscaled video frames 112.

As shown, mode selection module 913 (e.g., via a switch), may select, for a block or the like, between a best intra-prediction mode and a best inter-prediction mode based on minimum coding cost or the like. Based on the mode selection, a predicted portion of the video frame is differenced via differencer 911 with the original portion of the video frame (e.g., of downscaled video frames 112) to generate a residual. The residual is transferred to transform and quantization module 904, which transforms (e.g., via a discrete cosine transform or the like) the residual to determine transform coefficients and quantize the transform coefficients. The quantized transform coefficients are encoded via entropy encoder 109b into encoded bitstream 118. Other data, such as motion vector residuals, modes data, transform size data, or the like may also be encoded and inserted into encoded bitstream 118 for the portion of the video frame.

Furthermore, the quantized transform coefficients are inverse quantized and inverse transformed via inverse quantization and transform module 905 to generate a reconstructed residual. The reconstructed residual is combined with the aforementioned predicted portion at adder 912 to form a reconstructed portion, which is optionally deblocked and filtered via deblocking and CDEF filtering module 906 to generate a reconstructed frame. The reconstructed frame is then horizontally upscaled as discussed herein via horizontal upscale module 103. The resultant reconstructed and upscaled frame is the restoration filtered via restoration filtering module 109a using horizontal filter coefficients 116 and vertical filter coefficients generated by LRU horizontal filter decision module 104 and LRU vertical filter selection module 107, respectively, as discussed herein to generate a restored frame. The restored frame is then downscaled in only the horizontal dimension to generate a restored frame having the same resolution as downscaled frame 112 such that it may be used as a reference frame for inter prediction as shown with respect to coupling to inter-prediction module 909. Such processing may be repeated for each video frame of downscaled video frames 112 (and input video frames 111).

Figure 10:
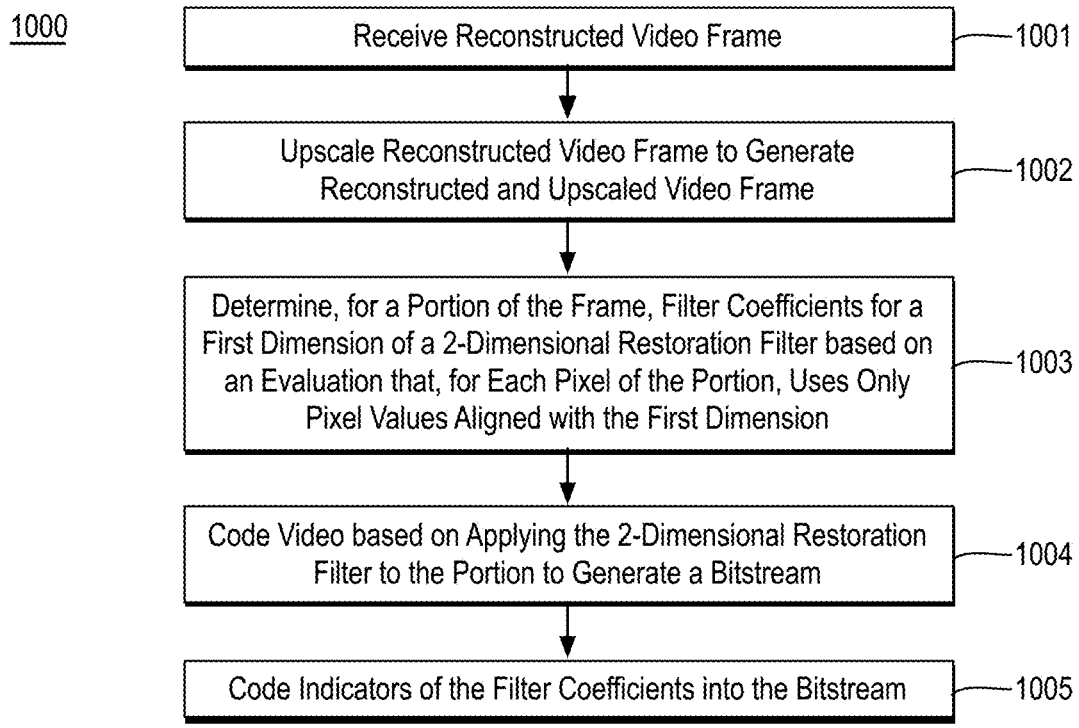
FIG. 10 is a flow diagram illustrating an example process for video coding including restoration filter coefficient selection.

FIG. 10 is a flow diagram illustrating an example process 1000 for video coding including restoration filter coefficient selection, arranged in accordance with at least some implementations of the present disclosure. Process 1000 may include one or more operations 1001-1005 as illustrated in FIG. 10. Process 1000 may form at least part of a video coding process. By way of non-limiting example, process 1000 may form at least part of a video coding process as performed by any device or system as discussed herein such as system 100 or encoder 900. Furthermore, process 1000 will be described herein with reference to system 1100 of FIG. 11.

Figure 11:
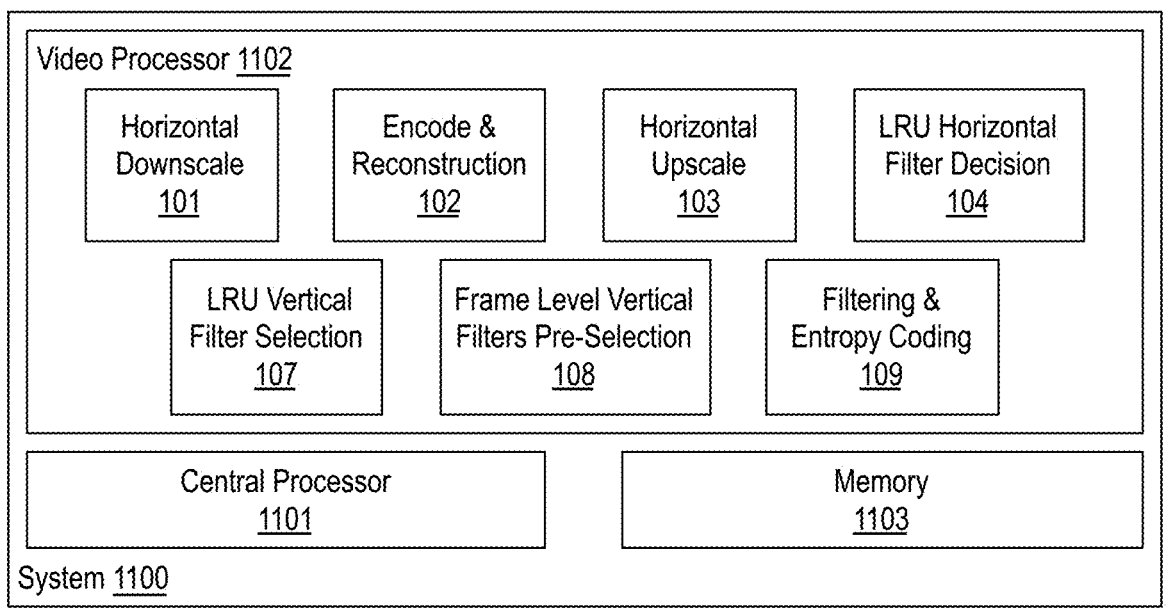
FIG. 11 is an illustrative diagram of an example system for video coding including restoration filter coefficient selection.

FIG. 11 is an illustrative diagram of an example system 1100 for video coding including restoration filter coefficient selection, arranged in accordance with at least some implementations of the present disclosure. As shown in FIG. 11, system 1100 may include a central processor 1101, a video processor 1102, and a memory 1103. Also as shown, video processor 1102 may include or implement horizontal downscale module 101, encode and reconstruction module 102, horizontal upscale module 103, LRU horizontal filter decision module 104, LRU vertical filter selection module 107, frame level vertical filters pre-selection module 108, and filtering and entropy encoding module 109. In an embodiment, memory 1103 implements frame buffer 907. Furthermore, in the example of system 1100, memory 1103 may store video data or related content such as frame data, LRU data, filter coefficients, bitstream data, and/or any other data as discussed herein.

As shown, in some embodiments, horizontal downscale module 101, encode and reconstruction module 102, horizontal upscale module 103, LRU horizontal filter decision module 104, LRU vertical filter selection module 107, frame level vertical filters pre-selection module 108, and filtering and entropy encoding module 109 are implemented via video processor 1102. In other embodiments, one or more or portions of horizontal downscale module 101, encode and reconstruction module 102, horizontal upscale module 103, LRU horizontal filter decision module 104, LRU vertical filter selection module 107, frame level vertical filters pre-selection module 108, and filtering and entropy encoding module 109 are implemented via central processor 1101 or another processing unit such as an image processor, a graphics processor, or the like.

Video processor 1102 may include any number and type of video, image, or graphics processing units that may provide the operations as discussed herein. Such operations may be implemented via software or hardware or a combination thereof. For example, video processor 1102 may include circuitry dedicated to manipulate frames, frame data, or the like obtained from memory 1103. Central processor 1101 may include any number and type of processing units or modules that may provide control and other high level functions for system 1100 and/or provide any operations as discussed herein. Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory.

In an embodiment, one or more or portions of horizontal downscale module 101, encode and reconstruction module 102, horizontal upscale module 103, LRU horizontal filter decision module 104, LRU vertical filter selection module 107, frame level vertical filters pre-selection module 108, and filtering and entropy encoding module 109 are implemented via an execution unit (EU). The EU may include, for example, programmable logic or circuitry such as a logic core or cores that may provide a wide array of programmable logic functions. In an embodiment, one or more or portions of horizontal downscale module 101, encode and reconstruction module 102, horizontal upscale module 103, LRU horizontal filter decision module 104, LRU vertical filter selection module 107, frame level vertical filters pre-selection module 108, and filtering and entropy encoding module 109 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 begins at operation 1001, where a reconstructed video frame is received for processing. For example, the reconstructed video frame corresponds to video to be coded. As used herein, a reconstructed video frame is a video frame reconstructed via a local decode loop of an encode process. Processing continues at operation 1002, where the reconstructed video frame is upscaled to generate a reconstructed and upscaled video frame. The reconstructed video frame is upscaled using any suitable technique or techniques such that the upscale is performed only in one dimension (e.g., a horizontal dimension). In an embodiment, the upscaling is only in the horizontal dimension and upscaling is not performed in the vertical dimension.

Processing continues at operation 1003, where, for at least a portion of the reconstructed and upscaled video frame, filter coefficients are determined for a first dimension of a 2-dimensional restoration filter to be applied to the portion such that determining the filter coefficients is an evaluation that, for each pixel of the portion, uses only pixel values that are aligned with the first dimension. In an embodiment, the first dimension is the same as the upscaling dimension applied at operation 1002. In an embodiment, the first dimension is the horizontal dimension. As used herein, the term using only pixel values aligned with a dimension indicates only pixel values from the frame or collocated in a reference frame (e.g., an original or source video frame) are used while pixel values misaligned are not used or are discarded. The 2-dimensional restoration filter may be any suitable filter. In an embodiment, the 2-dimensional restoration filter is a symmetric (e.g., coefficients are the same across the target pixel) and separable (e.g., the horizontal and vertical components may be applied separately). In an embodiment, the 2-dimensional restoration filter is a symmetric and separable 7-tap wiener filter.

The filter coefficients for the first dimension may be determined using any suitable technique or techniques. In an embodiment, determining the filter coefficients comprises evaluating 1-dimensional correlation between the portion and original pixel values of an original video frame along the first dimension such that the original video frame corresponds to the reconstructed and upscaled video frame (e.g., the reconstructed and upscaled video frame is a reconstructed and upscaled version of the original video frame). In an embodiment, evaluating the 1-dimensional correlation comprises evaluating autocorrelation and cross-correlation statistics along the first dimension. In an embodiment, determining the filter coefficients for the first dimension comprises the processor to evaluate only a subset of available sets of filter coefficients. The subset may include any suitable subset of all the available sets of filter coefficients. In an embodiment, the subset of available sets of filter coefficients comprises a first set of filter coefficients that are all zero, a second set of filter coefficients having first filter coefficients furthest from a pixel to be filtered of zero, second filter coefficients closest to the pixel to be filtered in the range of −2 to 2, and third filter coefficients between the first and second filter coefficients in the range of −2 to 2.

In an embodiment, process 1000 further includes determining the filter coefficients for the second dimension (e.g., the vertical dimension) of the 2-dimensional restoration filter. The filter coefficients for the second dimension may be determined using any suitable technique or techniques. In an embodiment, for the portion, second filter coefficients are selected for the second dimension (e.g., vertical dimension) of the 2-dimensional restoration filter by evaluating only a subset of available sets of filter coefficients. In an embodiment, indicators of the second filter coefficients are coded into a bitstream, such as the bitstream discussed with respect to operations 1004, 1005. In an embodiment, the subset of available sets of filter coefficients comprises a first set of filter coefficients that are all zero, a second set of filter coefficients having first filter coefficients furthest from a pixel to be filtered of zero, second filter coefficients closest to the pixel to be filtered in the range of −2 to 2, and third filter coefficients between the first and second filter coefficients in the range of −2 to 2. In an embodiment, for the portion, selection of second filter coefficients for the second dimension is skipped and the indicators provided in the bitstream indicate second filter coefficients of all zeroes.

Processing continues at operation 1004, where the video is coded to generate a bitstream based at least in part on applying the 2-dimensional restoration filter using the filter coefficients to restoration filter the portion. For example, the resultant restored video frame may be downscaled in the first dimension and used as a reference frame for subsequent frames to be coded. Processing continues at operation 1005, where indicators of the selected filter coefficients for the portion and for the first dimension (e.g., horizontal dimension) of the restoration filter are coded into the bitstream. In an embodiment, indicators of second selected filter coefficients for the portion and for the second dimension (e.g., vertical dimension) of the restoration filter are also coded into the bitstream. The indicator or indicators may be any suitable indicators (such as flags or bits) and the bitstream may be any suitable bitstream such as an AV1 compliant bitstream, etc. Process 1000 may also include the bitstream being transmitted and/or stored to memory. The bitstream may be transmitted and/or stored using any suitable technique or techniques. In an embodiment, the bitstream is stored in a local memory such as memory 1103. In an embodiment, the bitstream is transmitted for storage at a hosting device such as a server. In an embodiment, the bitstream is transmitted by system 1100 or a server for use by a decoder device.

Process 1000 may be repeated any number of times either in series or in parallel for any number frames or video segments or the like. As discussed, process 1000 may provide for video encoding including horizontal and vertical filter coefficient selection for restoration filtering.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
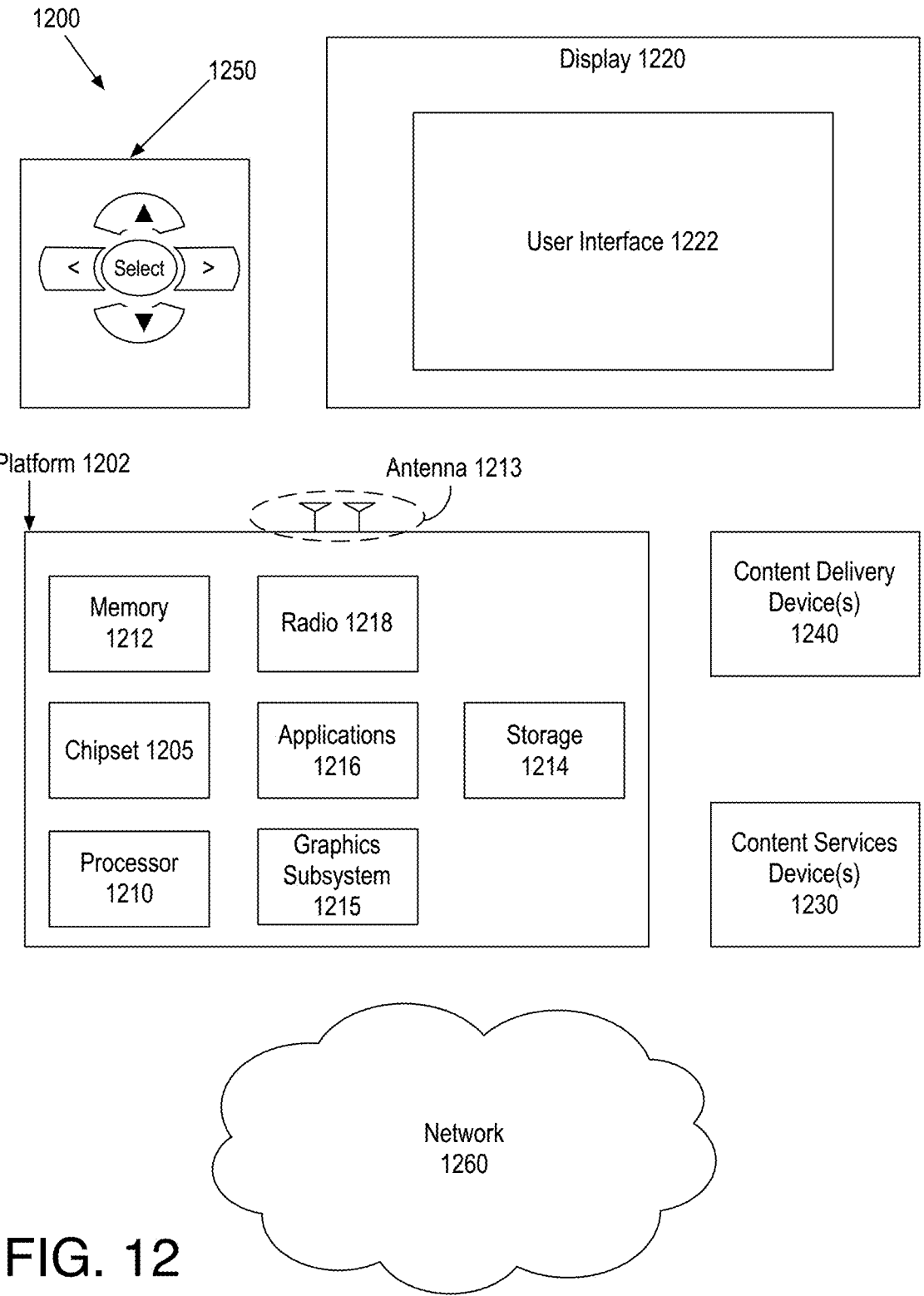
FIG. 12 is an illustrative diagram of an example system.

FIG. 12 is an illustrative diagram of an example system 1200, arranged in accordance with at least some implementations of the present disclosure. In various implementations, system 1200 may be a mobile system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of may be used to interact with user interface 1222, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1220) by movements of a pointer, cursor, focus ring, or other visual indicators displayed on the display. For example, under the control of software applications 1216, the navigation features located on navigation may be mapped to virtual navigation features displayed on user interface 1222, for example. In various embodiments, may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
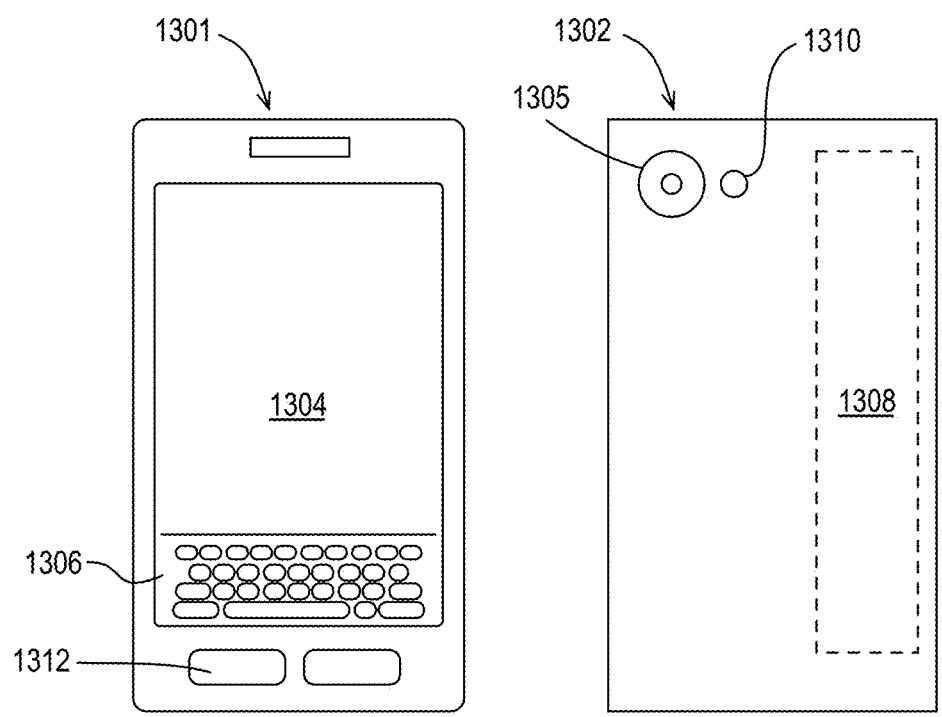
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, system 100 or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include a camera 1305 (e.g., including a lens, an aperture, and an imaging sensor) and a flash 1310 integrated into back 1302 (or elsewhere) of device 1300. In other examples, camera 1305 and flash 1310 may be integrated into front 1301 of device 1300 or both front and back cameras may be provided. Camera 1305 and flash 1310 may be components of a camera module to originate image data processed into streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A video coding system comprising:
a memory to store a reconstructed video frame of video for coding; and
a processor coupled to the memory, the processor to:
upscale the reconstructed video frame in only a horizontal dimension to generate a reconstructed and upscaled video frame;
determine, for at least a portion of the reconstructed and upscaled video frame, first filter coefficients along the horizontal dimension of a separable and symmetric 2-dimensional restoration filter to be applied to the portion, wherein the processor to determine the first filter coefficients along the horizontal dimension comprises an evaluation of 1-dimensional correlation between the portion and original pixel values of an original frame of video that, for each pixel of the portion, uses only pixel values that are aligned with the horizontal dimension;
selecting, for the portion, second filter coefficients along a vertical dimension of the 2-dimensional restoration filter based on evaluation of only a subset of available sets of filter coefficients; and
code the video, to generate a bitstream, based at least in part on application of the separable and symmetric 2-dimensional restoration filter using the first and second filter coefficients to restoration filter the portion; and
code first indicators of the first filter coefficients and second indicators of the second filter coefficients for the portion into the bitstream.

2. The video coding system of claim 1, wherein the evaluation of the 1-dimensional correlation between the portion and the original pixel values of the original frame of video comprises evaluation of autocorrelation and cross-correlation statistics along the horizontal dimension.

3. The video coding system of claim 1, the processor further to:
determine, for a second portion of the reconstructed and upscaled video frame, third filter coefficients along a horizontal dimension of a second separable and symmetric 2-dimensional restoration filter to be applied to the second portion;
skip, for the second portion, selection of fourth filter coefficients along a vertical dimension of the second separable and symmetric 2-dimensional restoration filter; and code third indicators of the third filter coefficients and second indicators indicating the fourth filter coefficients are zero into the bitstream.

4. The video coding system of claim 1, wherein the separable and symmetric 2-dimensional restoration filter is a 7-tap wiener filter, and wherein the subset of available sets of filter coefficients comprises a first set of coefficients that are all zero, a second set of filter coefficients having first coefficients furthest from a pixel to be filtered of zero, second coefficients closest to the pixel to be filtered in the range of −2 to 2, and third coefficients between the first and second filter coefficients in the range of −2 to 2.

5. The video coding system of claim 1, wherein the processor to determine the filter coefficients comprises the processor to evaluate only a subset of available sets of filter coefficients.

6. The video coding system of claim 1, the processor further to:
determine, for a second portion of the reconstructed and upscaled video frame, third filter coefficients along a horizontal dimension of a second separable and symmetric 2-dimensional restoration filter to be applied to the second portion, wherein the processor to determine the third filter coefficients comprises an evaluation that, for each pixel of the second portion, uses only pixel values that are aligned with the horizontal dimension, and wherein the processor is to determine the filter coefficients and the third filter coefficients at least partially simultaneously.

7. A computer-implemented method for encoding video comprising:
upscaling a reconstructed video frame in only a horizontal dimension to generate a reconstructed and upscaled video frame;
determining, for at least a portion of the reconstructed and upscaled video frame, first filter coefficients along the horizontal dimension of a separable and symmetric 2-dimensional restoration filter to be applied to the portion, wherein determining the first filter coefficients along the horizontal dimension comprises an evaluation of 1-dimensional correlation between the portion and original pixel values of an original frame of video that, for each pixel of the portion, uses only pixel values that are aligned with the horizontal dimension;
selecting, for the portion, second filter coefficients along a vertical dimension of the separable and symmetric 2-dimensional restoration filter by evaluating only a subset of available sets of filter coefficients; and
coding the video, to generate a bitstream, based at least in part on applying the separable and symmetric 2-dimensional restoration filter using the first and second filter coefficients to restoration filter the portion; and
coding first indicators of the first filter coefficients and second indicators of the second filter coefficients for the portion into the bitstream.

8. The method of claim 7, wherein determining the filter coefficients comprises evaluating only a subset of available sets of filter coefficients.

9. At least one non-transitory machine readable medium comprising a plurality of instructions that, in response to being executed on a computing device, cause the computing device to code video by:
upscaling a reconstructed video frame in only a horizontal dimension to generate a reconstructed and upscaled video frame;
determining, for at least a portion of the reconstructed and upscaled video frame, first filter coefficients along the horizontal dimension of a separable and symmetric 2-dimensional restoration filter to be applied to the portion, wherein determining the first filter coefficients along the horizontal dimension comprises an evaluation of 1-dimensional correlation between the portion and original pixel values of an original frame of video that, for each pixel of the portion, uses only pixel values that are aligned with the horizontal dimension;
selecting, for the portion, second filter coefficients along a vertical dimension of the separable and symmetric 2-dimensional restoration filter by evaluating only a subset of available sets of filter coefficients; and
coding the video, to generate a bitstream, based at least in part on applying the separable and symmetric 2-dimensional restoration filter using the first and second filter coefficients to restoration filter the portion; and
coding first indicators of the first filter coefficients and second indicators of the second filter coefficients for the portion into the bitstream.

10. The non-transitory machine readable medium of claim 9, wherein determining the filter coefficients comprises evaluating only a subset of available sets of filter coefficients.

11. The method of claim 7, wherein the evaluation of the 1-dimensional correlation between the portion and the original pixel values of the original frame of video comprises evaluation of autocorrelation and cross-correlation statistics along the horizontal dimension.

12. The method of claim 7, further comprising:
determining, for a second portion of the reconstructed and upscaled video frame, third filter coefficients along a horizontal dimension of a second separable and symmetric 2-dimensional restoration filter to be applied to the second portion;
skipping, for the second portion, selection of fourth filter coefficients along a vertical dimension of the second separable and symmetric 2-dimensional restoration filter; and
coding third indicators of the third filter coefficients and second indicators indicating the fourth filter coefficients are zero into the bitstream.

13. The method of claim 7, wherein the separable and symmetric 2-dimensional restoration filter is a 7-tap wiener filter, and wherein the subset of available sets of filter coefficients comprises a first set of coefficients that are all zero, a second set of filter coefficients having first coefficients furthest from a pixel to be filtered of zero, second coefficients closest to the pixel to be filtered in the range of −2 to 2, and third coefficients between the first and second filter coefficients in the range of −2 to 2.

14. The method of claim 7, further comprising:
determining, for a second portion of the reconstructed and upscaled video frame, third filter coefficients along a horizontal dimension of a second separable and symmetric 2-dimensional restoration filter to be applied to the second portion, wherein determining the third filter coefficients comprises an evaluation that, for each pixel of the second portion, uses only pixel values that are aligned with the horizontal dimension, and wherein determining the filter coefficients and determining the third filter coefficients are at least partially simultaneous.

15. The machine readable medium of claim 9, wherein the evaluation of the 1-dimensional correlation between the portion and the original pixel values of the original frame of video comprises evaluation of autocorrelation and cross-correlation statistics along the horizontal dimension.

16. The machine readable medium of claim 9, further comprising instructions that, in response to being executed on a computing device, cause the computing device to code video by:

determining, for a second portion of the reconstructed and upscaled video frame, third filter coefficients along a horizontal dimension of a second separable and symmetric 2-dimensional restoration filter to be applied to the second portion;

skipping, for the second portion, selection of fourth filter coefficients along a vertical dimension of the second separable and symmetric 2-dimensional restoration filter; and coding third indicators of the third filter coefficients and second indicators indicating the fourth filter coefficients are zero into the bitstream.

17. The machine readable medium of claim 9, wherein the separable and symmetric 2-dimensional restoration filter is a 7-tap wiener filter, and wherein the subset of available sets of filter coefficients comprises a first set of coefficients that are all zero, a second set of filter coefficients having first coefficients furthest from a pixel to be filtered of zero, second coefficients closest to the pixel to be filtered in the range of −2 to 2, and third coefficients between the first and second filter coefficients in the range of −2 to 2.

18. The machine readable medium of claim 9, further comprising instructions that, in response to being executed on a computing device, cause the computing device to code video by:

determining, for a second portion of the reconstructed and upscaled video frame, third filter coefficients along a horizontal dimension of a second separable and symmetric 2-dimensional restoration filter to be applied to the second portion, wherein determining the third filter coefficients comprises an evaluation that, for each pixel of the second portion, uses only pixel values that are aligned with the horizontal dimension, and wherein determining the filter coefficients and determining the third filter coefficients are at least partially simultaneous.

\* \* \* \* \*